July 13, 1965 W. R. BAUER 3,194,902

DIAL OPERATED TIMER

Filed Nov. 30, 1962 5 Sheets-Sheet 1

INVENTOR
WERNER ROBERT BAUER

BY Robert R. Candor

HIS ATTORNEY

INVENTOR
WERNER ROBERT BAUER

BY Robert R. Candor

HIS ATTORNEY

DIAL OPERATED TIMER
Filed Nov. 30, 1962
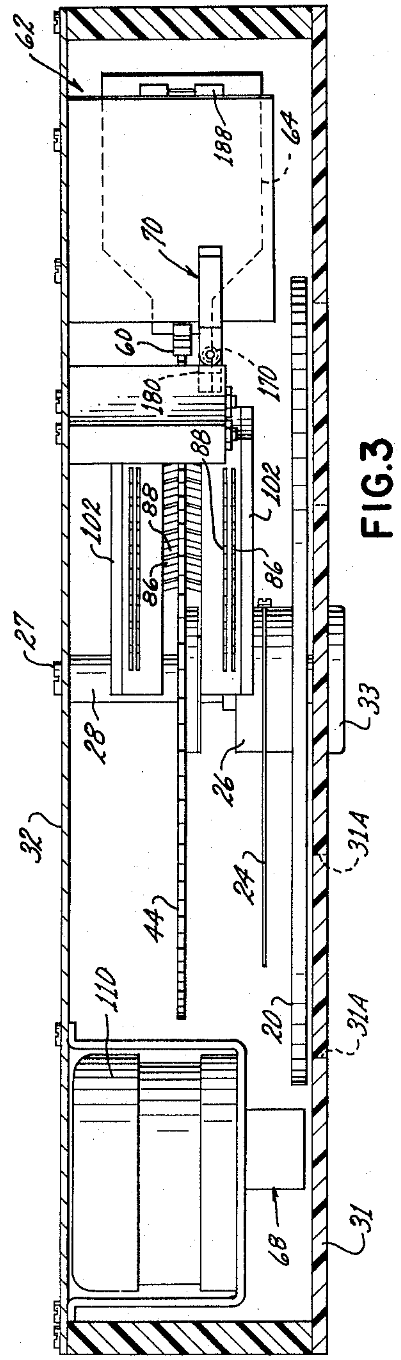
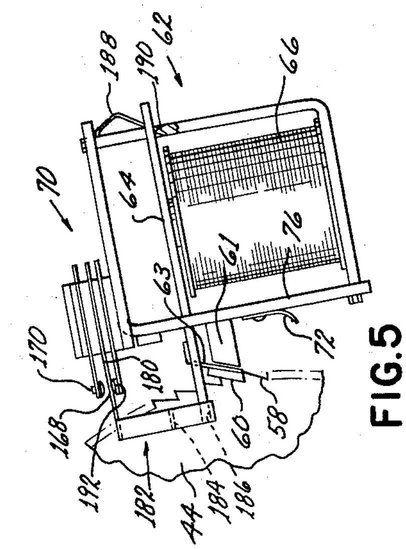
FIG.5
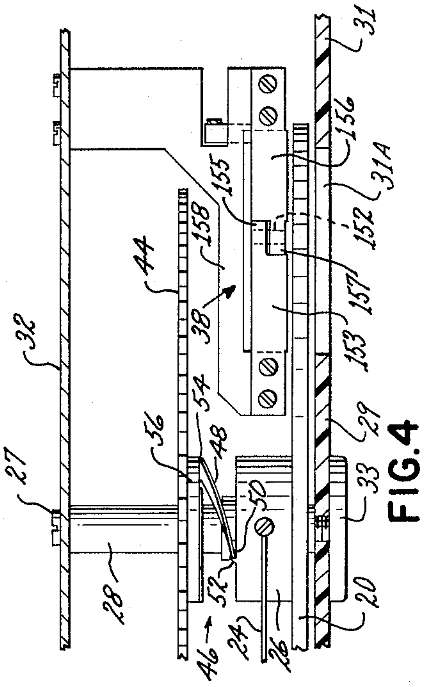
FIG.4
INVENTOR
WERNER ROBERT BAUER
BY Robert R. Sander
HIS ATTORNEY

INVENTOR
WERNER ROBERT BAUER

BY Robert R Candor
HIS ATTORNEY

INVENTOR
WERNER ROBERT BAUER

BY Robert [signature]

HIS ATTORNEY 3,194,902
DIAL OPERATED TIMER

Werner Robert Bauer, Columbus, Ohio, assignor to Robertshaw Controls Company, a corporation of Delaware Filed Nov. 30, 1962, Ser. No. 241,216
19 Claims. (Cl. 200—33)

This invention relates to a dial operated timer.

The timer of this invention may be provided with an operator rotated dial, such as a finger operated dial somewhat similar to a telephone dial. The operator may insert a finger in one of a plurality of finger receiving openings and then may turn the dial with the inserted finger to a stop position. The operation of the dial in this or similar manner simultaneously rotates a program card, which may be disc-like in shape, and advances the card to the start position of a program arc-like segment. Each of the plurality of finger receiving openings may correspond to one of a plurality of programs to be selected which have been printed or otherwise placed on the program card. Selection of any of the finger receiving openings and rotation of the dial correspondingly selects one of a plurality of programs which have been placed on the program card.

The timer of this invention may be connected to a plurality of control components of a member to be controlled, such as an automatic washing machine and the like. Menipulation of the timer dial as above described automatically selects and causes performance of one of a plurality of programs which the washing machine and the like is capable of producing.

Other features of this invention are apparent from this description, the appended claimed subject matter, and/or from the accompanying drawings in which:

FIGURE 3 is a horizontal cross section taken along the line 3—3 of FIGURE 2.

FIGURE 4 is a slanting cross section taken generally along line 4—4 of FIGURE 2 and below the plane of FIGURE 3.

FIGURE 5 is a diagrammatic vertical view of the stepping relay in a different position from that shown in FIGURE 2.

FIGURE 10 is a view somewhat similar to FIGURES 7, 8 and 9, but showing the wiring diagram energized to rotate the program card to card zero position upon manual actuation of an emergency push button or the like.

Figure 1:
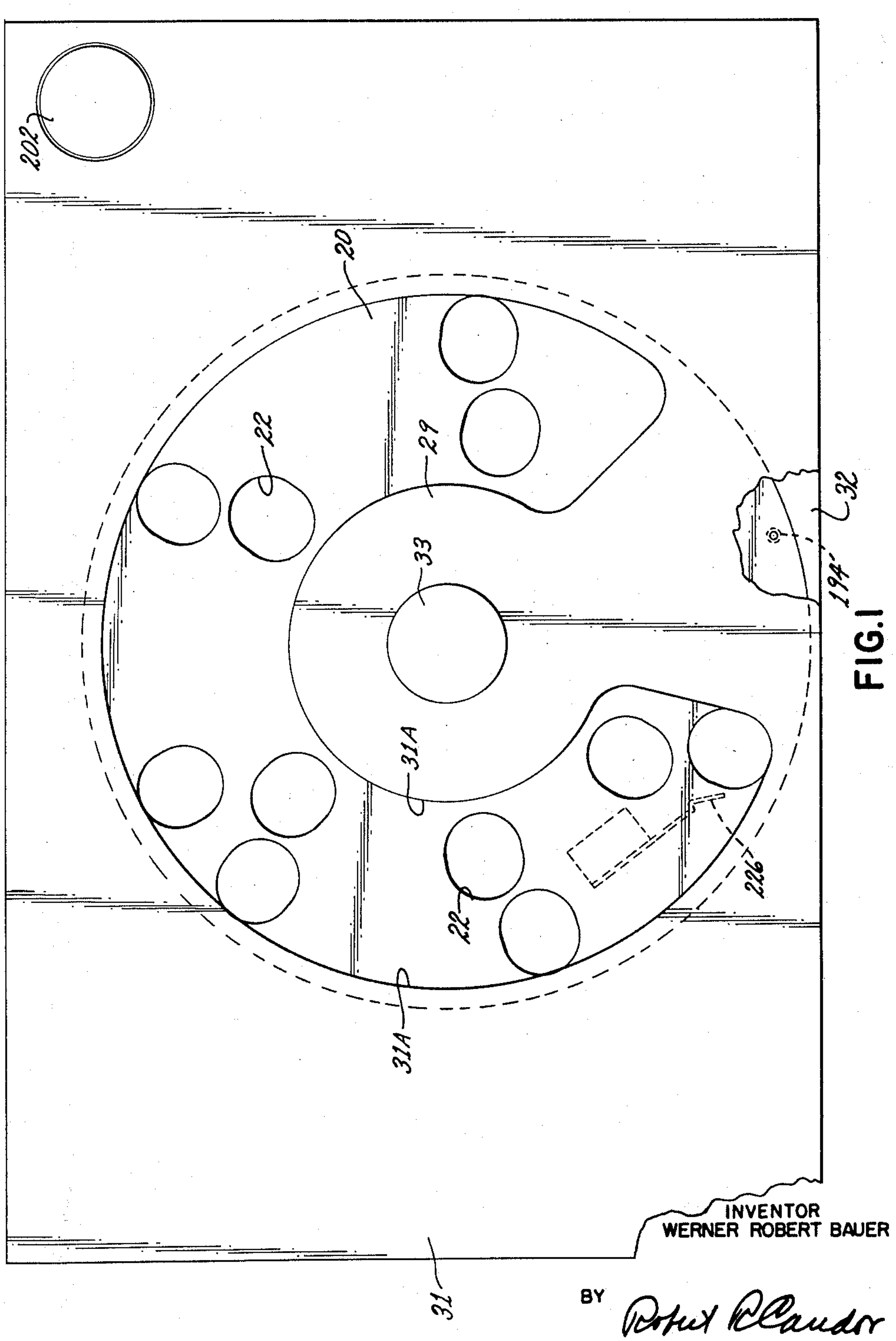
FIGURE 1 is a front elevation of the timer construction.

A timer according to this invention may include a finger operated dial 20 having a plurality of finger receiving openings 22 and being rotatable by insertion of operator's finger in a selected finger receiving opening 22 from a dial zero position, such as shown in FIGURE 1, and then rotating the dial with such finger to a selected program start position selected from a plurality of program start positions corresponding to the various openings 22.

Means automatically rotatably to return said dial 20 to a dial zero position, upon withdrawal of the operator's finger from the selected opening, may be provided. Such means may include a long flexible member, such as wire or belt 24, which may wind and unwind on a pulley 26 which may be drivingly connected to return the dial 20 to zero position.

The pulley 26 may be fixedly secured to the dial 20 and may be rotatably mounted on the fixed shaft 28, which may be secured to the back panel 32 by the screw 27.

The front end of shaft 28 may be secured to a front tongue 29 of a front panel 31 by means of a large headed screw 33. The tongue 29 and panel 31 provide an arcuate slot 31A through which the operator's finger may be inserted into the openings 22 on the dial 20.

The pulley 26 and dial 20 are manually rotated clockwise on shaft 28 and wind one end of the wire or belt 24 on pulley 26. The other end of the belt 24 winds and unwinds on the pulley 36 which pulley is spring tensioned to return the dial 20 to its zero position, which is illustrated in FIGURES 1–4, when the dial 20 is released by the withdrawal of the operator's finger.

The pulley 36 may be spring tensioned by means of a pulley 35 which is fixedly secured to pulley 36. Both pulleys may be mounted on a shaft 36A which is supported on the bracket construction 36B. A flat coil spring 35A has one end secured in a spool 34 which is rotatable on shaft 34A which is mounted on bracket 36B and which is spring tensioned to wind and unwind on the spool 34 and pulley 35 in a manner to spring tension the belt 24 as the belt winds on pulley 26 while unwinding from pulley 36. This action pulls the pulley 26 to rotate it, and dial 20, counterclockwise when the dial 20 is released by the operator's finger.

Figure 7:
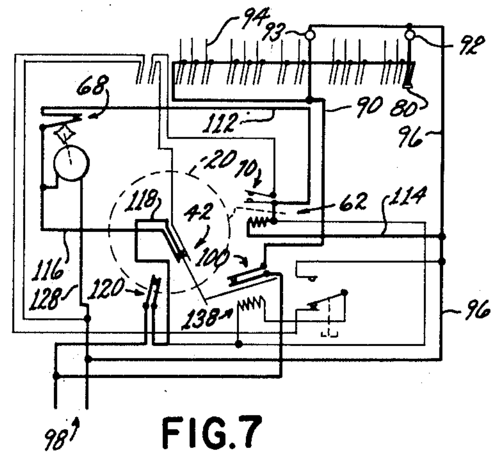
FIGURE 7 is a wiring diagram showing the switch and band positions of the diagram of FIGURE 6 to establish a wash cycle in a washing machine, for example.

The operator selects one of the openings 22, which corresponds to a program which he desires to have controlled in a member to be controlled, such as an automatic washing machine or the like. He then rotates the dial 20 clockwise with his finger in the selected hole 22, until the finger is stopped by engagement with a stop bar construction 38, which construction 38 will position the switch arm 40 in the dotted line position 40A, shown in FIGURE 2, so that the switch arm 40 of circuit change switch 42 will be locked in position 40A by the clockwise spring actuated movement of the relay armature 142 to position 142A. The switch 42 will then be conditioned to establish a wash cycle circuit, for example as shown in FIGURE 7.

The clockwise rotation of the dial 20, as just described, also rotates clockwise a program card 44 which is relatively rotatable about the shaft 28, and also is supported by such shaft 28.

The program card 44 is rotated by the dial 20 by any suitable one way rotation means, such as a one way clutch 46. FIG. 4, which drives the card 44 clockwise when the dial 20 is rotated clockwise, but allows the dial 20 to be rotated counterclockwise by belt 24 to the dial zero position shown in FIGURE 1 without at the same time rotating the card 44 counterclockwise. Such one way clutch 46 may include a spiral leaf spring construction 48, FIGURE 4, which has one end 50 downwardly biased so that it engages a one way ridge 52, which ridge 52 is fixedly connected to dial 20 by this pulley 26. The other end 54 of the spring construction 48 may be secured to a disc 56, which disc 56 may be fixedly secured to the card 44, and may also be relatively rotatable with the card 44 with respect to the shaft 28. This one way clutch 46 therefore rotates the card 44 clockwise, when the dial 20 is also rotated clockwise, but allows the dial 20 to be returned to the zero position by the belt 24 when the dial 20 is released by the operator.

Figure 2:
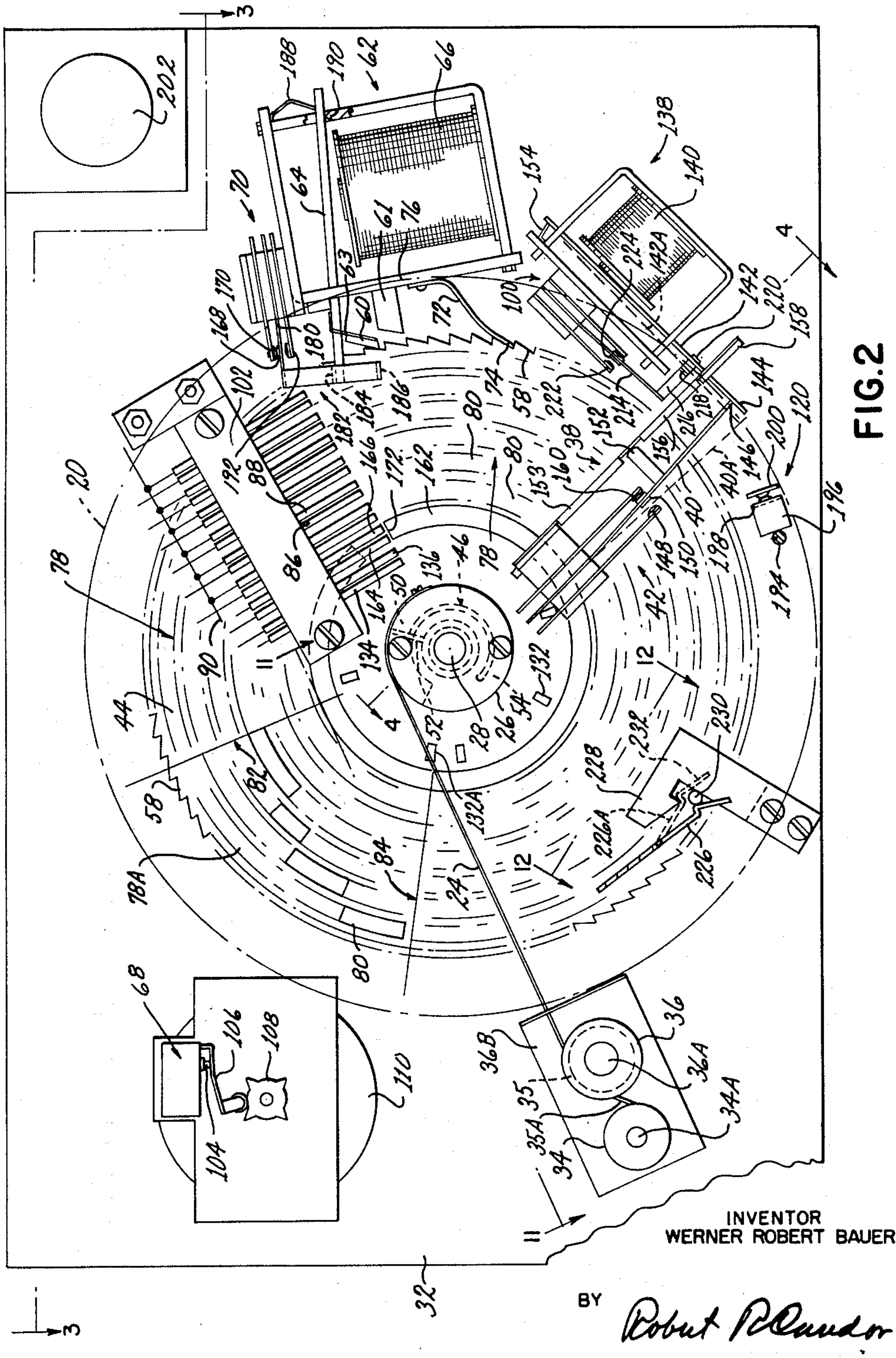
FIGURE 2 is a vertical cross section of the timer, take along an irregular vertical plane, to show the components in a clear manner, regardless of their location with respect to a regular vertical plane.

The program card 44 may be in the form of a circular disc having ratchet teeth 58, FIGURE 2, which may be engaged by the reciprocal tooth 60 of a stepping relay 62. The tooth 60 is mounted on the armature 64 of relay 62 by a spring 63 which biases the tooth 60 leftwardly against the teeth 58 for ratchet engagement therewith. The tooth 60 is actuated by the armature 64 of the relay 62, by intermittent energization of the coil 66 of the relay 62. This intermittent energization may be accomplished either by the motor actuated switch 68 at a relatively slow program speed, for example, as elsewhere described, or by the relay actuated switch 70, which actuates the card 24 at a relatively high return speed, for example, in a manner elsewhere described.

The card 44 may be prevented from being rotated counterclockwise by means of a leaf spring or pawl 72, which may have its end 74 leftwardly biased, in FIGURE 2, so it engages the teeth 58 in a manner to prevent counterclockwise rotation of the card 44. The leaf spring 72 may be supported in any suitable manner, as by the frame member 76 of the relay 62.

The tooth 60 acts as a brake or stop member to stop inertia rotation of card 44 when the tooth reaches its lower position of FIGURE 5. At that time a stationary wedging member 61 wedges the tooth 60 leftwardly so the tooth 60 holds the ratchet tooth 58 in wedged or locked condition to stop further inertia rotation of card 44.

A plurality of electrically conducting program band assemblies 78, FIGURE 2, may each include a plurality of program bands 80, which may be electrically conducting, and may be printed on the body of the program card or disc 44, which main body of the card may be made of electrically non-conducting material. Each of the electrically conducting program band assemblies 78 may extend along an arc-like segment, such as 78A, as an example, which may have a program start position or zone 82 and a program stop position or zone 84. These start and stop positions 82 and 84 may be provided for each of the program band assemblies 78.

Figure 6:
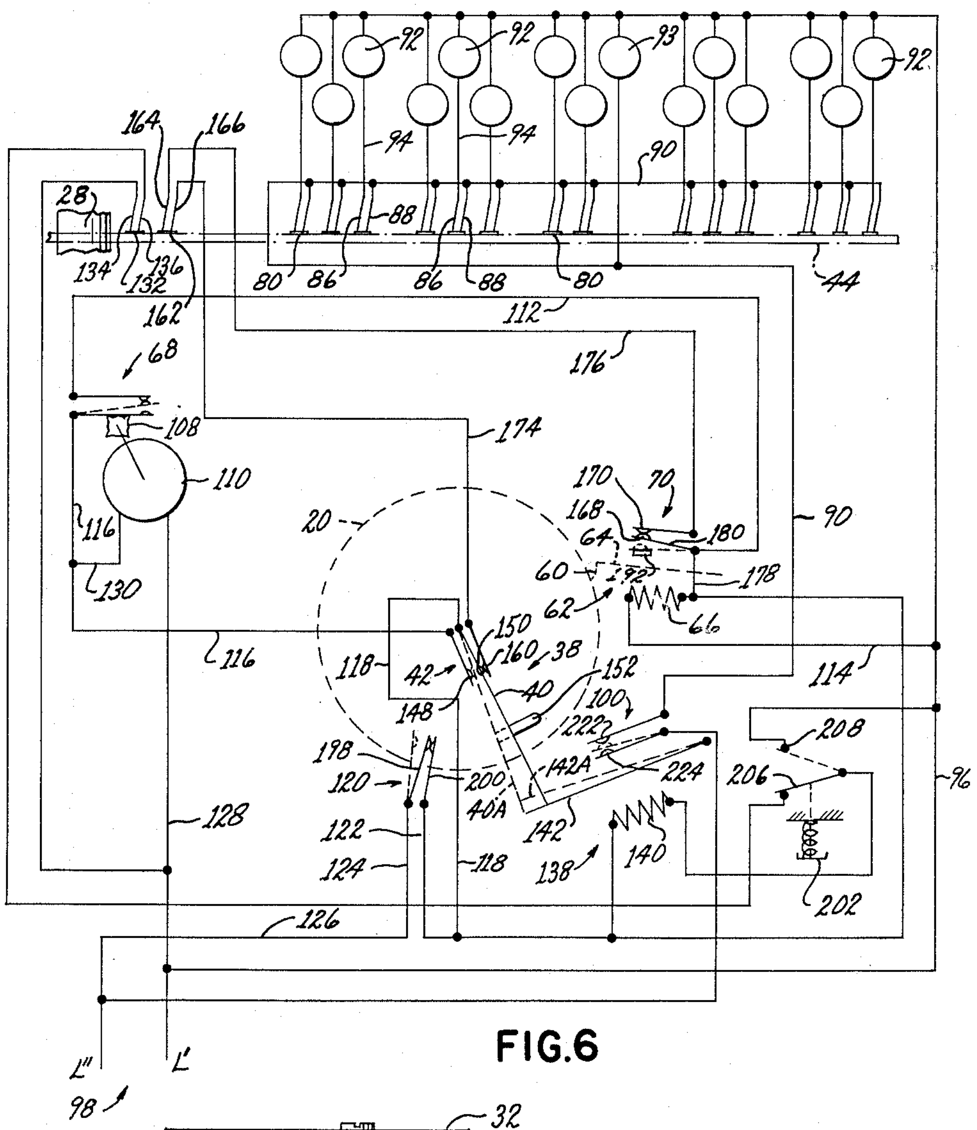
FIGURE 6 is a wiring diagram of the electrical system in the timer.
Figure 12:
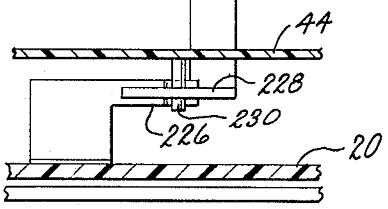
FIGURE 12 is a cross section along line 12—12 of FIGURE 2.

A plurality of electrically conducting program reading elements, or downwardly biased spring fingers, 86 and 88 may engage the program bands 80 to conduct electrical energy from an electrical energy supply power line 90, FIGURES 2 and 6, to a plurality of control components 92, of a member to be controlled to perform selected programs, such as the control components of an automatic washing machine or the like. The feed of electrical energy to the proper washing machine components 92 may be controlled by the program bands 80, which electrically bridge the ends of respective pairs of reading elements or fingers 86 and 88. Each respective pair of reading elements 86 and 88 properly energizes the proper electrical leads 94 which are respectively connected to the respective components 92.

The electrical components 92 may also be connected to the return electric line 96, FIGURE 6, which is connected to one of the lines L′ of the electrical supply 98. The energy supply line 90 may be electrically connected to the other power supply line L″ through the medium of the timer controlled switch 100, as elsewhere described.

The program "ON" light 93, shown in FIGURE 6, may be energized directly from line 90, without reading fingers 86 or 88 or bands 80, whenever the wash cycle of FIGURE 7 is established. The light 93 remains illuminated as long as any wash program is being controlled by the timer according to FIGURE 7.

The contact ends of the reading fingers 86 and 88 may be so positioned with respect to the rotation of the program card 44 that such ends of the fingers 86 and 88 are in proper relationship with the program start position 82 of the selected program, such as 78A, so the start position 82 reaches the positions of the ends of the reading fingers 86 and 88 at the time that the operator's finger in the corresponding opening 22 of dial 20 is stopped by the stop bar construction 38. This permits the reading members 86 and 88 to start to read the program selected, such as 78A which causes the program card 44 to be slowly rotated at program speed as is elsewhere described.

The fingers 86 and 88, as well as other fingers to be described, may engage one or both sides of the card 44 and may be supported by stationary insulating bars 102. Such fingers may be metal spring fingers and their ends may be resiliently biased into engagement with the conductor bands 80, etc. which are printed on the card 44.

The general construction of the reading fingers 86, 88 etc., the support bars 102 and program card 44 may be of the general character as more fully described in applicant's co-pending applications Serial Numbers 224,980 and 191,509, to which reference is made, if necessary, for a more detailed description of such members. However, in this application, the reading members, or reading fingers, are shown as being arranged in pairs, such as pairs 86, 88, with both fingers of each pair engaging a wide band 80, to bridge the electrical energy from one reading finger 86 to the other reading finger 88, with the electrical energy not initially being received from the band 80.

In the program 78A, a plurality of program bands 80 are shown in full lines in a miscellaneous manner to indicate that these bands may be continuous for different miscellaneous lengths to produce a desired program of energizations of components 92. However, it is not intended specifically to show any particular program by these full line bands 80, which are merely illustrative of a possible program. Any program may be selected and printed on the card 44 specifically for the particular washing machine or the like which is being designed and manufactured by the washing machine manufacturer or designer.

Program speed card rotating means may be provided which is energized upon rotation of the dial 20 to the selected program start position 82 to rotate the card 44 at program speed throughout a program arc of the selected program, such as program 78A. Such means may include the stepping relay 62, which oscillates the reciprocal tooth 60 one tooth length at a time upon intermittent energization of the relay coil 66 under the control of motor switch 68. The switch 68 may be of any suitable type, and may be a snap switch if desired, such as is disclosed in the patent to Kohl, No. 2,458,518, patented January 11, 1949. Such switch 68 may be opened and closed by the longitudinal movement of the plunger 104 which may be actuated by an arm 106. The arm 106 may be oscillated by the cam construction 108 to cycle the switch 68 once every two minutes, for example. However, any desired interval of time for such oscillation may be provided. The cam 108 may be rotated at proper speed to obtain the intermittent periods desired by the timer motor 110 through proper gear reduction.

The opening and closing of the switch 68 intermittently energizes the line 112 which is connected to line 178, relay coil 66, lines 114 and 96, and power line L′. The other side of the switch 68 is connected by the line 116, contacts 148 and 150 of switch 42, lines 118 and 122, closed master switch 120, lines 124 and 126 and power line L″. At the same time the timer motor 110 is energized from line L′ through electric line 128, and has its other side connected to lines 130 and 116, switch 42, line 118, switch 120, line 126, which has previously been described as being connected to line L″ under proper conditions.

The wiring circuit for the production of the selected program, such as 78A, is shown in heavy lines in FIGURE 7 with the various switches and other parts of the timer construction in proper condition to produce the wash cycle program which has been selected. The wiring circuit of FIGURE 7 may be compared with FIGURE 6 for a more detailed understanding of its operation.

Heavy lines are indicated along some lines 94 and part of line 96 which energize the "ON" light 93 and one of the components 92. These parts are energized in accordance with the arrangement of the particular program bands 80 which may or may not energize any particular component 92 at any particular time, as is readily understood.

Figure 8:
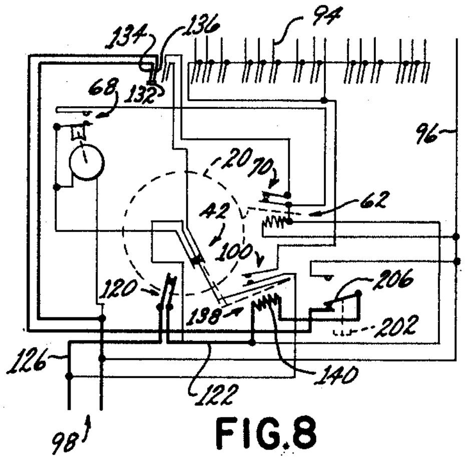
FIGURE 8 is a wiring diagram similar to FIGURE 7, but showing the system energized by one of the program step bands to finish the wash cycle.

Means are provided to change the wiring pattern when a program stop position 84 is reached to produce the pattern of FIGURE 8. To this end, a series of electrically conducting program stop bands 132, FIGURE 2, may be printed on the card 44 to be contacted by the pair of reading members or fingers 134 and 136 when any particular program reaches the stop position 84.

For example, when the program stop reading construction, such as the reading members or fingers 134 and 136 reads the program stop band 132A, for example, at the end of program 78A, then the wiring pattern is changed from the pattern of FIGURE 7 to the pattern of FIGURE 8. The pattern of FIGURE 8 energizes coil 140 of an unlatching relay 138 by the electrical bridging of reader fingers 134, 136 by stop band 132A so coil 140 pulls down the armature 142 of such relay 138. When this happens, the end 144 of armature 142, FIGURE 2, is pulled down from position 142A down below the end 146 of the blade 40, to the full line position 142, so that the blade 40 can snap back from position 40A to the full line position 40 to open the contacts 148 and 150 of switch 42, and to close contacts 150 and 160.

These contacts 148 and 150 previously were closed when the operator's finger engaged stop bar construction 38 which had pushed down the plunger 152 and blade 40 to the dotted position 40A. When the blade 40 had been pushed down to position 40A, the armature 142 had snapped up to the dotted line position, because the armature 142 is upwardly biased by the spring 154. The armature in position 142A had locked the blade in position 40A during the entire program time.

The stop bar construction 38 may include two leaf springs 153 and 156, FIGURE 4, which are supported by a bracket 158 which is supported on back panel 32. These leaf springs respectively have ends 155 and 157 which overlap each other and straddle the upper end of the plunger 152. By this construction, the operator's finger will actuate the plunger 152 and blade 40 when the finger engages either the spring 153 or the spring 156 or both of these springs.

When the contacts 148, 150 of switch 42 are opened, at the program stop position 84, FIGURE 8, the power supply to the motor 110 is broken. Also the power supply 112 is broken to the relay coil 66 to stop the relatively slow program speed of rotation of card 44, and the heavy line circuit of FIGURE 8 is established and energization of coil 140 will move armature 142 and blade 40 to establish the heavy line circuit FIGURE 9, which produces a return condition of the electrical components of the timer.

Figure 9:
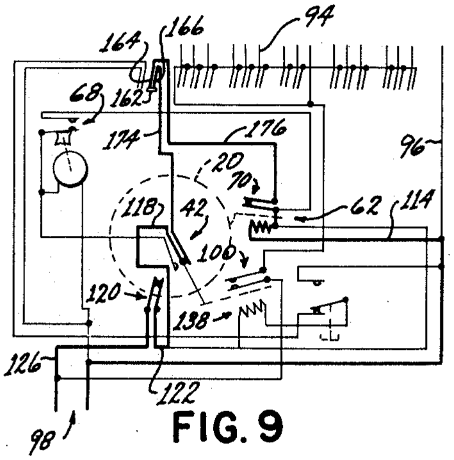
FIGURE 9 is a wiring diagram similar to FIGURES 7 and 8, but showing the diagram energized by the return band to rotate the program card to card zero position.

The rightward movement of the blade 40 under the conditions of FIGURE 8, caused the contacts 150 and 160 of switch 42 to be closed to permit the electrically conducting card zero position return band 162, FIGURE 2, to bridge the return band reading construction or fingers 164, 166 to return the card 44 to card zero position, such as illustrated in FIGURE 2. A relatively fast card return drive means is energized and will rotate the card 44 at relatively fast return speed to the zero position when the return circuit is energized as shown in FIGURE 9. For example, the band 162 and the reading members 164 and 166 energize a circuit which passes through the switch 70, the contacts 168 and 170 of which are opened and closed, FIGURES 2 and 5, by the rocking movement of the armature 64 in response to the energization and deenergization of the relay coil 66. The result is that a fast alternating make and break circuit is operated through coil 66, somewhat of the "bell ringer" type, so that the driving tooth 60 is oscillated at a relatively fast rate, to actuate teeth 58 of the card 44 and to rotate the card quickly to the zero position. When the card 44 reaches the card zero position, the end 172 of return band 162 passes from under the reading fingers 164 and 166, FIGURE 2, thereby to break the circuit of the switch 70 and the relay 62. The entire timer and washing machine operation is stopped by this last operation timer condition.

The "bell ringer" circuit may be traced from power line L″, FIGURE 2, through lines 126, 124, switch 120 lines 122, 118, contacts 150, 160, line 174, reader finger 166, band 162, reader finger 164, line 176, contacts 170, 168, line 178, relay coil 66, lines 114, 96 and power line L′.

The switch blade 180 of switch 70 carries a make and break member 182, FIGURE 2, which has strike bars 184 and 186 which are to be alternately struck by armature 64. The strike bar 184 is struck by the end of the armature 64 during the last 10% of the upward travel of the armature 64 as it is being upwardly moved by the spring 188 about the fulcrum 190, when the relay coil 66 was deenergized, to move the blade 180 upward and to close the contacts 168 and 170. This establishes an electric circuit through the coil 66 of the relay 62, as previously described. Energization of the coil 66 pulls the armature 64 down so that its end strikes the strike bar 186 in the last 10% of its downward travel. This pulls the blade 180 down against the stationary non electrical stop member 192 and opens the contacts 168 and 170 to denergize the armature coil 66. Such deenergization allows the armature to fly upwardly again under spring actuation to close contacts 168, 170, etc., to continue the "bell ringer" oscillation. This produces a relatively high speed stepping rotation of the disc or card 44 back to the zero position.

The master switch 120 is opened while the finger dial 20 is being rotated clockwise by the operator's finger and is closed when the dial 20 returns to zero position automatically. The switch 120 includes to spring blades 198 and 200 which are spring biased in open position.

A pin 194, FIGURE 2, carried by the dial 20, strikes the flange 196 of the switch blade 198 to move the blade 198 against blade 200, so that the switch 120 is closed while the dial 20 remains in zero position, with pin 194 against blade 198, and is opened when the dial 20 is rotated by the operator's finger to move pin 194 away from blade 198.

Figure 10:
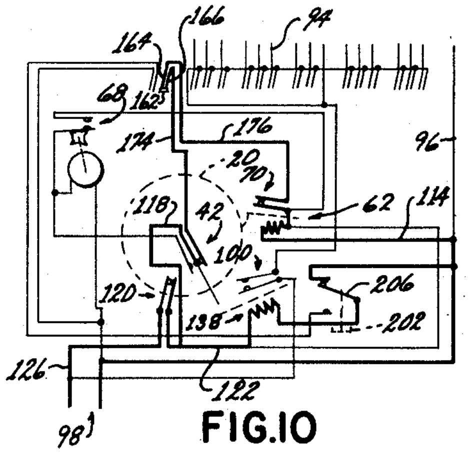
Figure 11:
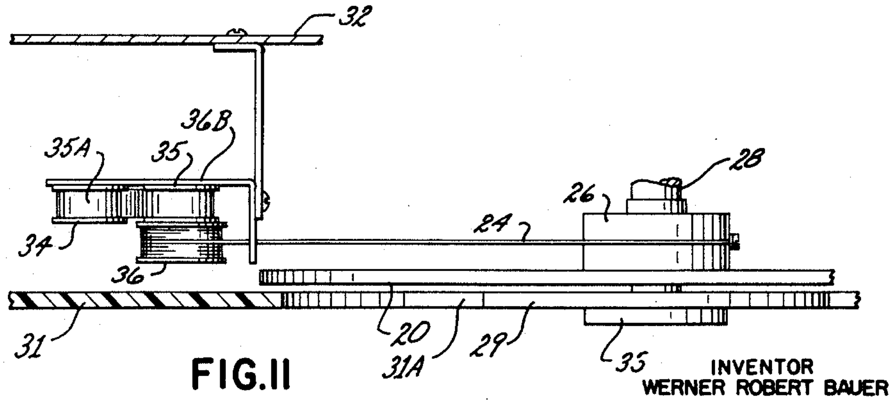
FIGURE 11 is a horizontal cross section along line 11—11 of FIGURE 2.

Manually operable emergency return means is provided to return the card 44 to card zero position from any other card position in which the card may happen to be. For example, a push button 202 may be spring biased in the down position, in FIGURE 6, but may be pushed against such spring action by manual pushing of the button 202 which may be held by the operator in the pushed position until the card is returned to the zero position. When the push button 202 is pushed to the upper position, in FIGURE 6, the contact 206 is also moved to the upper position in FIGURE 6 engages the stationary contact 208. This establishes the heavy line circuit of FIGURE 10 in which a fast relay operation of relay 62 and is manually produced with substantially the same result as produced in FIGURE 9 wherein the bell ringer type operation of the relay 62 fast steps the card 44 to the zero position. This return movement automatically stops when the end 172 of the return band 162 travels from the under the end contacts of fingers 164 and 166, which opens the circuit at the reading fingers 164 and 166 after the return of all of the elements of the timer to the zero position.

The timer of this invention may be connected with the components of any member to be controlled in any desired manner. For example, the timer may be connected with the control components of an automatic washing machine in any desired manner, such as is now known.

If desired all the make and break switches may be snap switches, for example, of the character disclosed in the Kohl patent elsewhere identified.

The switch 100, FIGURE 2, has a blade 214 which carries a make and break member 216 having upper and lower strike bars 218 and 220. The armature 142 strikes the member 218 near the end of upward movement when the coil 140 is deenergized. This closes the contacts 222 and 224 when the armature 142 is moved upwardly by the spring 54. The coil 140 is then energized when contacts 222 and 224 are closed. The armature 142 is then pulled down and hits the strike bar 220 near the end of its downward movement when it is pulled down by the coil 140 when it is energized from the contacts 222 and 224.

A spring hook 226 is carried by the dial 20 and has its end spring biased to the position 226A, FIGURE 2, so that it hooks into a stationary hook member 228 carried by the back plate 32 of the timer. When the dial 20 automatically returns to zero position after having been rotated clockwise by the operator's finger, the hook 226 engages the hook 228, so that the dial 20 cannot be moved by the operator clockwise from the zero position or by any frictional action or the like of the card 44 while it travels clockwise. However, a pin 230 is carried by the card 44. The pin 230 engages the lip 232 of the spring 226 as the card 44 is driven clockwise to the zero position, in FIGURES 9 and 10, and holds the spring 226 in the full line position of FIGURE 2, so that the dial 20 may be moved from its zero position by the operator's finger for the selection of a program.

Wherever desired, the bands 80, etc., make and break the bridging of the reader fingers during the time that the disc 44 is being stepped by the relay finger 60 so the reader finger ends may be provided with a quick make and break.

It is thus to be seen that a timer construction has been provided which may be readily set by an operator's finger or hand in a manner somewhat similar to a telephone dialing action. A simple single dialing of the dial automatically selects the desired program and advances the program controlling member to the starting point of the selected program.

While the form of the invention now preferred has been disclosed as required by statute, other forms may be used, all coming within the scope of the claimed subject matter which follows.

What is claimed is:

1. A timer comprising: a finger operated dial having a plurality of finger receiving openings and being rotatable from a dial zero position to a selected program start position selected from a plurality of program start positions corresponding to said openings with the insertion of an operator's finger in a selected finger receiving opening; dial return means connected to said dial automatically rotatably to return said dial to dial zero position upon withdrawal of said finger from said selected opening; a one way rotation means; a program card rotatable with said dial by said one way rotation means from a card zero position to a correspondingly selected card program start position selected by finger rotation of said dial from a plurality of card program start positions; a plurality of electrically conducting program band assemblies on said card each assembly extending along an arc-like segment from a program start position to a program stop position; a member to be controlled by components of said member; electrically conducting program reading elements engaging said program bands and being electrically connectable to said components of said member to be controlled by such components to perform the selected programs; program speed card rotating means energized upon rotation of said dial to a program start position to rotate said card at program speed throughout the arc of said selected program; a series of electrically conducting program stop bands at the stop positions of said programs to stop said program speed card rotating means; a program stop reading construction having means to read said program stop bands and to condition a card zero position return circuit to return said card to zero position; an electrically conducting card zero position return band continuously extending along said program band assemblies; a return band reading construction having means to read said return band and to energize said card zero position return circuit to return said card to card zero position at return speed after the termination of said selected program; and a card return drive means to rotate said card to card zero position when said return circuit is energized.

2. A timer according to claim 1 in which manually operable emergency return means is provided to return said card to card zero position from any other card position.

3. A timer according to claim 1 in which said one way rotation means is a one way clutch.

4. A timer according to claim 1 in which said dial return means includes a long flexible member drivingly connected with said dial and which winds and unwinds to return said dial to dial zero position.

5. A timer according to claim 1 in which said program card has a plurality of ratchet teeth engaged by a reciprocal tooth of an intermittently energizable relay to rotate said card.

6. A timer according to claim 5 in which said relay is intermittently energized at a relatively slow program speed during the control of a selected program, and at a relatively fast return speed while returning said card to card zero position.

7. A timer according to claim 5 in which said relay is intermittently energized by a motor operated make and break switch.

8. A timer according to claim 5 in which said relay is intermittently energized by a make and break switch operated by said relay.

9. A timer according to claim 1 in which means are provided to lock said dial in dial zero position against rotation while said card is away from said card zero position.

10. A timer according to claim 1 in which a circuit change switch is locked in one position by a spring biased relay armature when said armature is not energized and in which said change switch is spring biased and released to another circuit position by magnetically energized movement of said armature when said relay is energized.

11. A timer comprising: a movable circuit controller; a stepping relay having a relay coil and a relay armature oscillated toward said coil by intermittant energization of said coil; means moving said armature away from said coil by intermittent deenergization of said coil; driving means for said controller having driving connections with said armature; a switch having contacts intermittently energizing said relay coil when said contacts are closed and intermittently deenergizing said coil when said contacts are opened; and a make and break member closing and opening said contacts and having a pair of strike members alternately struck by said armature to open and close said contacts, one of said strike members being struck by said armature during the last portion of travel of said armature away from said coil to close said contacts, and another of said strike members being struck by said armature during the last portion of travel of said armature toward said coil to open said contacts.

12. A timer comprising: a circuit controlling card with a card zero position and having an electrically conducting program band assembly and an electrically conducting return band construction; an electric motor with a relatively slow make and break switch; a stepping relay having an intermittently energizable relay coil and a reciprocable relay armature; card driving means to drive said card operated by reciprocation of said armature; a circuit means causing said slow make and break switch intermittently to energize said relay coil to operate said armature to operate said card driving means at a relatively slow rate; and a relatively fast make and break switch operted by said relay aramture in electrical control series with said return band and said relay coil, causing said relatively fast make and break switch intermittently to energize said relay coil to cause relatively fast oscillation of said armature and relatively fast return of said card to card zero position.

13. In combination; a dial means rotatable by an operator from a dial zero position to a selected program start position selected from a plurality of program start positions; a rotatable program controller having selecting means rotatable by operation of said dial means to move said controller from a controller zero position to a selected controller program start position selected from said plurality of controller program start positions as selected by operator rotation of said dial means; dial return means connected to said dial automatically to return said dial means to dial zero position upon release of said dial means by said operator; and program control means and controller return means controlled by said controller effective upon selective operator rotation of said dial means to said selected position to cause said program controller to control a selected program and then to rotate said controller to said controller zero position.

14. A combination according to claim 13 in which said dial means has a plurality of openings for insertion of an operator's finger to rotate said dial means to select a program.

15. A combination according to claim 14 in which program start means is actuated by the operator's finger when said dial means is rotated to the selected program start position.

16. In combination: a dial means rotatable by an operator from a dial means zero position to select a selected program start position from a plurality of program start positions on said dial; dial return means connected to said dial automatically to return said dial means to said zero position upon release of said dial means by said operator; one way drive means; a program controller means having a zero position and a plurality of programs, each with a start position and program stop position movable by said one way drive means from a controller means zero position to a controller means selected program start position selected from a plurality of controller means program start positions selected by said operator rotation of said dial means; and control means controlled by said controller means effective upon selective operator rotation and operator release of said dial means to cause said controller means to control said selected program and then to move said controller means to said controller means zero position.

17. In combination: a dial rotatable by an operator from a dial zero position to a plurality of program start positions; dial return means connected to said dial automatically to return said dial to said dial zero position upon release of said dial by said operator; a program card and rotating means connected with said card to rotate said card from a card zero position to a selected start position of said plurality of program start positions upon operator rotation of said dial; a controlled mechanism to be controlled by said programs; a plurality of program bands in program assemblies on said card to control a plurality of programs to be performed by said controlled mechanism; a plurality of program terminating bands on said card effective at the ends of said programs; a card return band construction and return means connected to said band construction effective to cause rotation of said card to card zero position at the termination of a selected program; and reading and circuit control means cooperating with said bands and with said rotating means and said return means to cause a selected program energization of said controlled mechanism and to return said card to said card zero position at the termination of said selected program.

18. A timer comprising: a finger operated dial having a plurality of finger receiving openings and being rotatable from a dial zero position to a selected program start position selected from a plurality of program start positions corresponding to said openings with the insertion of an operator's finger in a selected finger receiving opening; dial return means connected with said dial automatically rotatably to return said dial to dial zero position upon withdrawal of said finger from said selected opening; a one way rotation means; a program circuit rotor controller and means connected with said controller to cause said controller to be rotatable with said dial by said one way rotation means from a controller zero position to a correspondingly selected program start position selected by finger rotation of said dial from a plurality of program start positions; a member to be controlled by components of said member to perform selected programs; a plurality of electrical circuit controlling program rotor member assemblies on said rotor controller, each assembly extending from a program start position to a program stop position; electrical circuit controlling program non-rotor elements engaging said program rotor elements and being electrically connectable to said components of said member to be controlled by such components to perform the selected programs; program speed rotor controller rotating means energized upon rotation of said dial to a program start position to rotate said rotor controller at program speed throughout the extent of said selected program; a series of electrical circuit controlling program stop rotor members at the stop positions of said programs to stop said program speed rotor controller rotating means; an electrical circuit controlling program stop non-rotor element engaging said program stop rotor members to condition a return circuit to return said rotor controller to rotor controller zero position at return speed; and a rotor controller return drive means to rotate said rotor controller to controller zero position when said return cricuit is energized.

19. In combination: a dial rotatable by an operator from a dial zero position to a plurality of program start positions, and return means connected to said dial automatically to return said dial to said dial zero position upon release of said dial by said operator; a program circuit rotor controller rotatable from controller zero position to a plurality of program start positions upon operator rotation of said dial; a plurality of electrical circuit controlling program rotor member assemblies on said rotor controller to control a plurality of programs to be performed by a controlled mechanism; a controlled mechanism to be controlled by programs on said controller a plurality of program terminating rotor members on said rotor controller at the ends of said programs; and non-rotor circuit control means cooperating with said rotor members to cause a selected program energization of said controlled mechanism and a return of said rotor controller to controller zero position at the termination of said selected program.

References Cited by the Examiner

UNITED STATES PATENTS

| | | | |
|---|---|---|---|
| 2,709,235 | 5/55 | Baude | 200—33 |
| 2,990,462 | 6/61 | Dietz | 200—105 |
| 3,032,618 | 5/62 | Johnson | 200—38 |

BERNARD A. GILHEANY, *Primary Examiner.*